(12) United States Patent
Banno et al.

(10) Patent No.: US 10,241,603 B2
(45) Date of Patent: Mar. 26, 2019

(54) TOUCH PANEL DEVICE

(71) Applicant: MITSUBISHI JIDOSHA KOGYO KABUSHIKI KAISHA, Tokyo (JP)

(72) Inventors: Osamu Banno, Tokyo (JP); Risa Tokairin, Tokyo (JP); Masako Abe, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/314,610

(22) PCT Filed: Feb. 19, 2015

(86) PCT No.: PCT/JP2015/000790
§ 371 (c)(1),
(2) Date: Nov. 29, 2016

(87) PCT Pub. No.: WO2016/021086
PCT Pub. Date: Feb. 11, 2016

(65) Prior Publication Data
US 2017/0192567 A1 Jul. 6, 2017

(30) Foreign Application Priority Data
Aug. 4, 2014 (JP) .................................. 2014-158640

(51) Int. Cl.
*G06F 3/041* (2006.01)
*G06F 3/045* (2006.01)
(Continued)

(52) U.S. Cl.
CPC .......... *G06F 3/0412* (2013.01); *G06F 3/0418* (2013.01); *G06F 3/04817* (2013.01); *G06F 3/04886* (2013.01); *G06F 2203/04803* (2013.01)

(58) Field of Classification Search
CPC ....... G06F 3/044; G06F 3/0416; G06F 3/0488
See application file for complete search history.

(56) References Cited

U.S. PATENT DOCUMENTS

2005/0225540 A1 10/2005 Kawakami et al.
2008/0302582 A1* 12/2008 Sekhri .................... G08C 17/02
178/18.06
(Continued)

FOREIGN PATENT DOCUMENTS

JP 2007-299198 A 11/2007
JP 2009-053181 A 3/2009
(Continued)

*Primary Examiner* — Nan-Ying Yang
(74) *Attorney, Agent, or Firm* — Birch, Stewart, Kolasch & Birch LLP

(57) ABSTRACT

There is provided a touch panel device including an advance key that is assuredly touchable by an operator with no cost increase. A touch panel device (1) includes a plurality of keys (3) to (13) each including an indication part on which a corresponding one of functions is indicated, and a plurality of touch detection areas provided over the respective indication parts of the plurality of keys (3) to (13). The touch panel device (1) recognizes an operation instruction in any of the touch detection areas that corresponds to a predetermined key when the indication part of the predetermined key is touched. The plurality of keys include at least an advance key (13). The touch detection area (13B) of the advance key (13) is larger than the indication part (13A) of the advance key (13).

4 Claims, 4 Drawing Sheets

(51) Int. Cl.
    *G06F 3/0481*      (2013.01)
    *G06F 3/0488*      (2013.01)

(56) References Cited

U.S. PATENT DOCUMENTS

| | | | |
|---|---|---|---|
| 2010/0060597 A1* | 3/2010 | Choi | G06F 3/04886 345/173 |
| 2011/0029185 A1* | 2/2011 | Aoki | B60K 37/06 701/31.4 |
| 2013/0019191 A1* | 1/2013 | Arnold | G06F 3/04886 715/765 |
| 2013/0100063 A1 | 4/2013 | Saeki | |

FOREIGN PATENT DOCUMENTS

| | | | |
|---|---|---|---|
| JP | 2010-250376 A | | 11/2010 |
| JP | 2011-065510 A | | 3/2011 |
| JP | 2013-117916 A | | 6/2013 |
| JP | 2013-222290 A | | 10/2013 |
| JP | 2013222290 A | * | 10/2013 |
| WO | WO 2012-144235 A1 | | 10/2012 |

\* cited by examiner

TOUCH PANEL DEVICE

TECHNICAL FIELD

The present invention relates to touch detection areas of a touch panel device.

BACKGROUND ART

Regarding display apparatuses such as car navigation systems, touch panel devices that detect inputs made by operators touching the devices are widely known and used. In such a touch panel device, since a key touched by the operator is recognized as input information, the detection of key touch is particularly important. In a typical touch panel device, however, touch detection areas where the touch by the operator is detected are all arranged in correspondence with the sizes of indications of the respective keys. Therefore, if the touched position is out of the intended touch detection area, the touch cannot be detected.

As a solution to the above problem, there is a known technique in which the touch detection area of each key is changed on the basis of the history of key touch (see PTL 1, for example). There is another known technique in which the touch detection area of each key is gradually changed on the basis of the history of key touch (see PTL 2, for example). There is yet another known technique in which a reactive area for an inputtable key is made larger than a predetermined reactive area in a direction toward a reactive area for an uninputtable key among reactive areas for keys adjacent to the inputtable key (see PTL 3, for example).

CITATION LIST

Patent Literature

PTL 1: Japanese Unexamined Patent Application Publication No. 2011-65510
PTL 2: Japanese Unexamined Patent Application Publication No. 2013-117916
PTL 3: Japanese Unexamined Patent Application Publication No. 2007-299198

SUMMARY OF INVENTION

Technical Problem

The above techniques each have a problem in that, while the sizes of the touch detection areas for all of the keys on the touch panel device can be increased, the operation of controlling the sizes of the touch detection areas is complicated and therefore leads to a cost increase. Examples of a situation where the operator accidentally touches a key different from the key he/she wants to select include a situation where the size of indication of that key is small, a situation where the distance between that key and a key adjacent thereto is short, a situation where that key is at an end of the touch panel device, and so forth. Exemplary keys under such situations include an advance key that advances the screen or the tab on the screen.

The present invention is to solve the above problem and provides a touch panel device including an advance key that is assuredly touchable by an operator with no cost increase.

Solution to Problem

According to one aspect of this invention, there is provided a touch panel device including a plurality of keys each including an indication part on which a corresponding one of functions is indicated; and a plurality of touch detection areas provided over the respective indication parts of the plurality of keys, the touch panel device recognizing an operation instruction in any of the touch detection areas that corresponds to a predetermined key when the indication part of the predetermined key is touched. The plurality of keys include at least an advance key. The touch detection area of the advance key is larger than the indication part of the advance key.

According to a second aspect of the invention, in the touch panel device according to the first aspect of the invention, the touch detection area of the advance key interferes with the indication part of one of the keys that is adjacent to the advance key.

According to a third aspect of the invention, in the touch panel device according to the second aspect of the invention, the indication part of the adjacent key includes an icon part and a character part, and the touch detection area of the advance key interferes with the character part.

According to a fourth aspect of the invention, in the touch panel device according to any of the first to third aspects of the invention, the advance key is a key that advances a tab and/or a key that advances a screen.

According to a fifth aspect of the invention, in the touch panel device according to any of the first to fourth aspects of the invention, the touch detection areas are shifted downward with respect to the respective indication parts.

According to a sixth aspect of the invention, in the touch panel device according to any of the first to fourth aspects of the invention, the touch detection areas are shifted in accordance with a layout of the respective indication parts.

According to a seventh aspect of the invention, in the touch panel device according to any of the first to sixth aspects of the invention, the touch panel device is included in an onboard center display provided between a driver's seat and a passenger's seat provided adjacent to the driver's seat; the advance key is provided at each of left and right ends or the left or right end of a screen; in a case of a vehicle with a right-hand steering wheel, the touch detection area is made larger than the indication part in the advance key provided at the left end; and, in a case of a vehicle with a left-hand steering wheel, the touch detection area is made larger than the indication part in the advance key provided at the right end.

Advantageous Effects of Invention

According to the present invention, since the advance key includes the touch detection area that is larger than the indication part thereof, the ease of touching by the operator can be improved with no cost increase.

DESCRIPTION OF EMBODIMENTS

Figure 1:
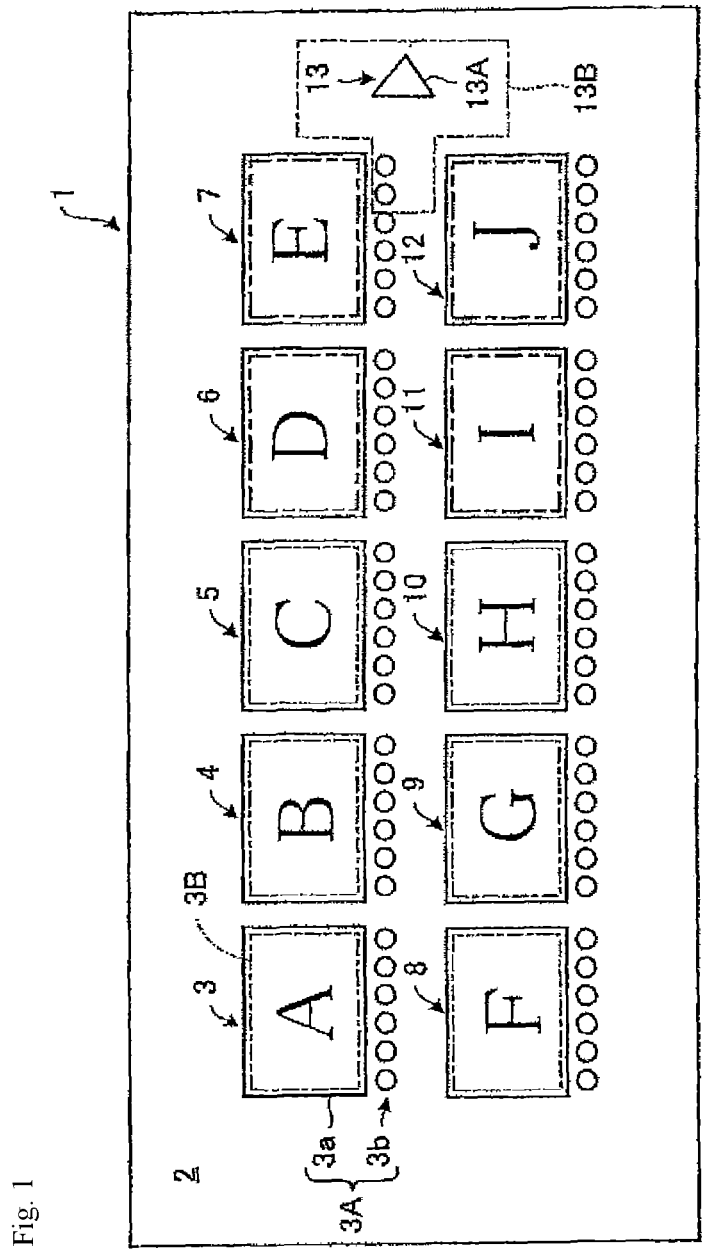
FIG. 1 is a schematic diagram of a touch panel device according to a first embodiment of the present invention.

FIG. 1 illustrates a touch panel device employing a first embodiment of the present invention. Referring to FIG. 1, a touch panel device 1 is included in an onboard display and displays, for example, a screen of a navigation system. A screen 2 of the touch panel device 1 has a plurality of keys including function keys 3 to 12 and an advance key 13.

The function keys 3 to 12 exert respective functions when touched by an operator. The function key 3 includes an indication part 3A and a touch detection area 3B that detects the touch thereon made by the operator. The indication part 3A includes an icon part 3a on which anything such as a symbol, an illustration, or a character ("A" in the first embodiment) that represents the function is drawn, and a character part 3b on which a character string that represents the function is written. In FIG. 1, the touch detection area 3B is illustrated in a slightly smaller size than the icon part 3a. Actually, however, the touch detection area 3B is of the same size as the icon part 3a. As with the function key 3, the other function keys 4 to 12 each include an indication part, including an icon part (a corresponding one of "B" to "J" in the first embodiment) and a character part, and a touch detection area, although not denoted by reference numerals.

The advance key 13 has a function of changing the display on the screen 2 to a display of the next page when touched by the operator. The advance key 13 includes an indication part 13A on which an arrow representing the change to the next page is drawn, and a touch detection area 13B. The indication part 13A is smaller than the icon part of each function key both in the vertical direction and in the horizontal direction, whereas the touch detection area 13B is larger than the icon part of each function key both in the vertical direction and in the horizontal direction within a range in which the touch detection area 13B does not interfere with the icon part of the function key 7 adjacent thereto. Particularly, in the horizontal direction, the touch detection area 13B is extended up to a position where the touch detection area 13B interferes with the character part of the function key 7 adjacent thereto. The extension of the touch detection area 13B up to a position where the touch detection area 13B interferes with the character part is implemented because an experiment has proved that it is very rare for the operator to touch the character part when selecting any of the function keys.

In the above configuration, since the advance key 13 includes the touch detection area 13B that is larger than the indication part 13A thereof, the ease of touching by the operator can be improved with no cost increase. Furthermore, since the touch detection area 13B is extended up to a position interfering with the character part of the function key 7, the assuredness of the touching by the operator can further be improved.

Figure 2:
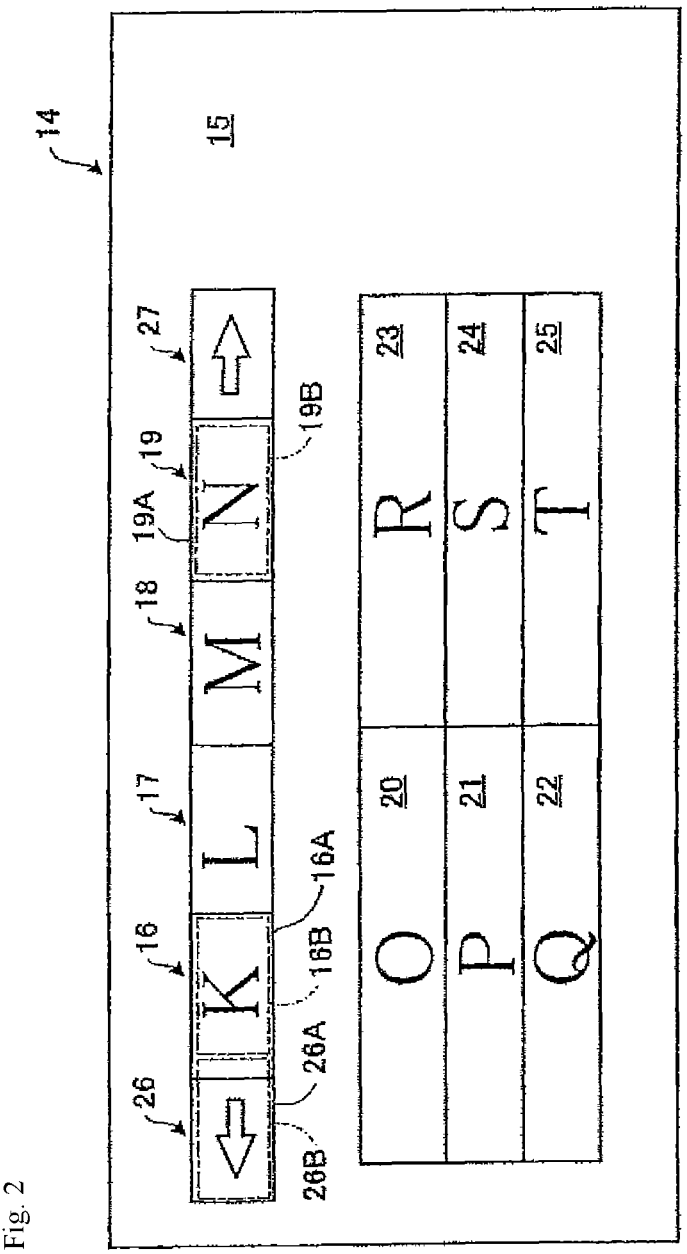
FIG. 2 is a schematic diagram of a touch panel device according to a second embodiment of the present invention.

FIG. 2 illustrates a touch panel device employing a second embodiment of the present invention. Referring to FIG. 2, a touch panel device 14 is included in an onboard display and displays, for example, a screen for selecting the radio station. A screen 15 of the touch panel device 14 has a plurality of keys including function keys 16 to 19, indication keys 20 to 25, and two advance keys 26 and 27.

The function keys 16 to 19 exert respective functions when touched by the operator. The function key 19 includes an indication part 19A on which anything such as a symbol, an illustration, or a character ("N" in the second embodiment) that represents the function is drawn, and a touch detection area 19B that detects the touch thereon made by the operator. In FIG. 2, the touch detection area 19B is illustrated in a slightly smaller size than the indication part 19A. Actually, however, the touch detection area 19B is of the same size as the indication part 19A. As with the function key 19, the function keys 17 and 18 and the indication key 27 each include an indication part and a touch detection area, although not illustrated. In the second embodiment, indications of different radio stations are provided on the respective indication keys 20 to 25. One of the keys that corresponds to the currently selected radio station is displayed in reverse colors.

The advance key 26 has a function of changing the display on the screen 15 to a display of the preceding page when touched by the operator. The advance key 26 includes an indication part 26A on which an arrow representing the change to the preceding page is drawn, and a touch detection area 26B. The indication part 26A is smaller in the horizontal direction than an indication part 16A of the function key 16 adjacent thereto, whereas the touch detection area 26B is extended in the horizontal direction in such a manner as to interfere with the indication part 16A of the function key 16 adjacent thereto. With the extension of the touch detection area 26B, the size of a touch detection area 16B of the function key 16 in the horizontal direction is reduced. The extension is implemented within a range of, for example, about 2 mm so that the normal touching on the function key 16 is not hindered.

In the above configuration, since the advance key 26 includes the touch detection area 26B that is larger than the indication part 26A thereof, the ease of touching by the operator can be improved with no cost increase. Furthermore, since the touch detection area 26B is extended up to a position interfering the indication part 16A of the function key 16, the assuredness of the touching by the operator can further be improved. The touch detection area of the other advance key 27 is not extended because the advance key 27 is not positioned at an end of the screen 15 and it does not seem very difficult for the operator to touch the advance key 27.

Figure 3:
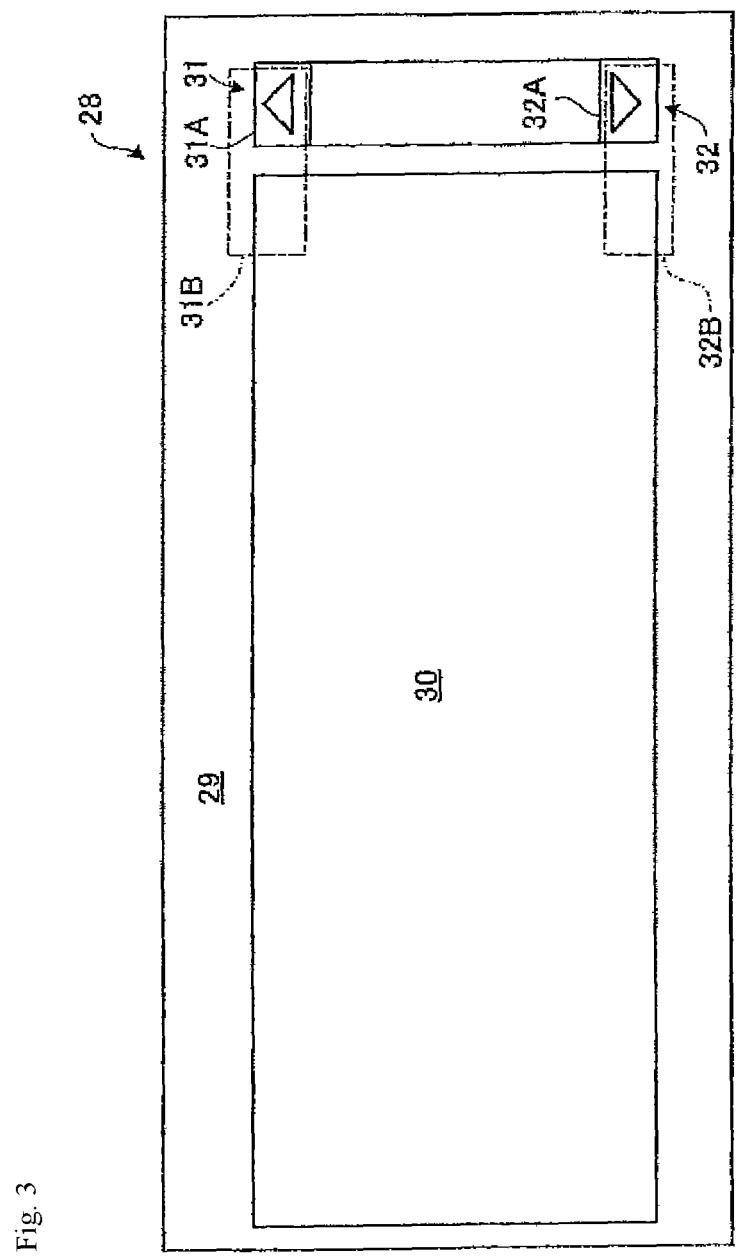
FIG. 3 is a schematic diagram of a touch panel device according to a third embodiment of the present invention.

FIG. 3 illustrates a touch panel device employing a third embodiment of the present invention. Referring to FIG. 3, a touch panel device 28 is included in an onboard display and displays, for example, a screen for selecting an audio station. A screen 29 of the touch panel device 28 has a display screen 30 and two advance keys 31 and 32.

The display screen 30 displays information on the currently selected song or artist. The advance key 31 has a function of scrolling the display on the display screen 30 upward when touched by the operator. The advance key 32 has a function of scrolling the display on the display screen 30 downward. The advance key 31 includes an indication part 31A on which an arrow representing the upward scroll is drawn, and a touch detection area 31B. The advance key 32 includes an indication part 32A on which an arrow representing the downward scroll is drawn, and a touch detection area 32B. The indication parts 31A and 32A are short in the horizontal direction so as not to interfere with the display screen 30 adjacent thereto, whereas the touch detection areas 31B and 32B are extended in the horizontal direction in such a manner as to interfere with the display screen 30 adjacent thereto. The touch detection areas 31B and 32B are extended in the vertical direction as well toward margin areas where nothing is provided. The margin areas are provided on the upper and lower sides of the touch detection areas 31B and 32B, respectively.

In the above configuration, since the advance keys 31 and 32 each include the touch detection area 31B or 32B that is larger than the indication part 31A or 32B thereof, the ease of touching by the operator can be improved with no cost increase. Furthermore, since the touch detection area 31B or 32B is extended up to a position interfering the display screen 30, the assuredness of the touching by the operator can further be improved.

In the above embodiments, the advance keys 13 and 26 have been described as members each having a function of advancing the page, and the advance keys 31 and 32 have been described as members each having a function of advancing the screen. However, the advance key is not limited to such members. For example, the advance key may be a member having a function of advancing the tab. Moreover, while FIG. 1 illustrates a case where the advance key 13 is provided at the right end of the screen 2, the advance key 13 according to the present invention may be provided at the left end of the screen 2 or at each of the right and left ends.

In the above embodiments, the touch detection areas 13B, 26B, 31B, and 32B of the advance keys 13, 26, 31, and 32 may be shifted and extended further downward. This is based on the result of an experiment showing that, when pressing a key, many operators press a part of the key that is lower than the center of the key. Thus, the pressing of the advance keys 13, 26, 31, and 32 is more assuredly performed.

Furthermore, in the above embodiments, the touch detection areas 13B, 26B, 31B, and 32B of the advance keys 13, 26, 31, and 32 may be shifted in accordance with the layouts of the indication parts 13A, 26A, 31A, and 32A. Specifically, if any other key is present on the lower side of the advance key 13, the touch detection area 13B may be shifted upward, rightward, or leftward. If any other key is present on the upper side of the advance key 13, the touch detection area 13B may be shifted downward, rightward, or leftward. Thus, the ease of operation can be improved without hindering the operation of other keys. Moreover, since the arrangement of the keys is not disturbed, the appearance of the key arrangement can be improved.

Figure 4:
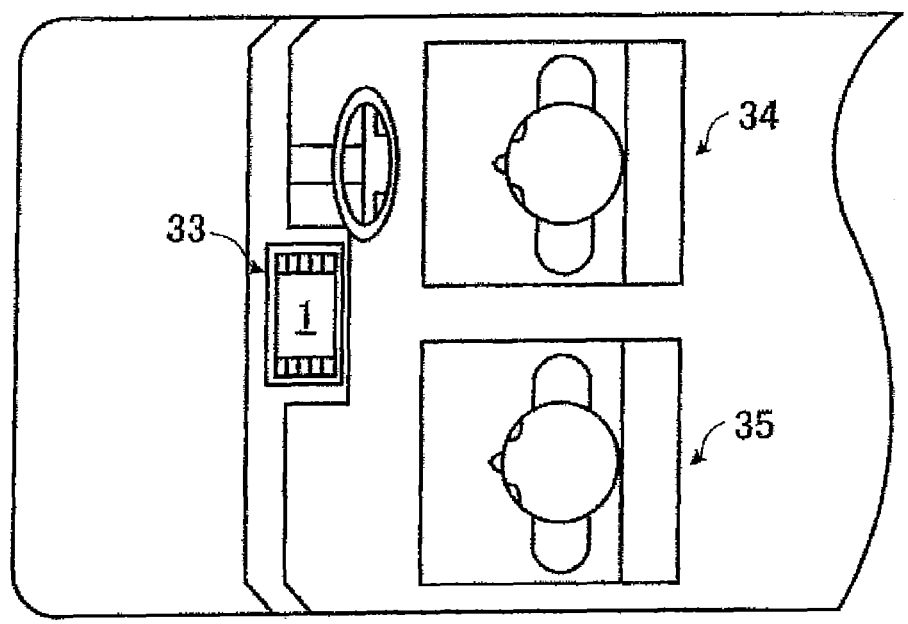
FIG. 4 is a schematic plan view of a vehicle equipped with a touch panel device according to the present invention and illustrates a driver's seat and peripheral elements.

Referring to FIG. 4, suppose that the touch panel device 1 configured as described above is included in an onboard center display 33 provided between a driver's seat 34 and a passenger's seat 35, with the advance key 13 being provided at each of the right and left ends of the touch panel device 1. In the case of a vehicle with a right-side steering wheel, the touch detection area 13B is made larger than the indication part 13A in the advance key 13 provided at the left-side. In the case of a vehicle with a left-hand steering wheel, the touch detection area 13B is made larger than the indication part 13A in the advance key 13 provided at the right end. Thus, the assuredness of the touching on the advance key 13 by the driver can further be improved. Likewise, the advance keys 13, 26, 31, and 32 according to the above embodiments are each also applicable to the touch panel device 1 included in the onboard center display 33 provided between the driver's seat 34 and the passenger's seat 35 as illustrated in FIG. 4.

While some preferred embodiments of the present invention have been described above, the present invention is not limited to the above specific embodiments. Various changes and modifications can be made to the above embodiments, unless otherwise specified in the above description, within the scope of the present invention that is defined by the claims. The advantageous effects described in the embodiments of the present invention are only exemplary ones of most preferable effects produced by the present invention, and the advantageous effects of the present invention are therefore not limited to those described in the above embodiments of the present invention.

REFERENCE SIGNS LIST 1, 14, 28 touch panel device
3, 4, 5, 6, 7, 8, 9, 10, 11, 12, 16, 17, 18, 19 a plurality of keys (function key)
3a icon part
3b character part
3A, 19A indication part
3B, 19B touch detection area
13, 26, 31, 32 a plurality of keys (advance key)
13A, 26A, 31A, 32A indication part
13B, 26B, 31B, 32B touch detection area
33 onboard center display
34 driver's seat
35 passenger's seat

The invention claimed is:

1. A touch panel device included in an onboard display, the touch panel device comprising:
an advance key including an indication part on which corresponding functions is indicated and advances a screen displayed on the onboard display to another screen, and a touch detection area provided over the indication part of the advance key, the touch panel device recognizing an operation instruction in the touch detection area when the touch detection area is touched,
wherein the advance key is provided in at least one of a left end and a right end of the screen, and the touch detection area is larger than the indication part, and
wherein in a case the advance key is provided at the left end of the screen, the touch detection area is extended toward a center of the screen by a distance greater than a distance extended toward the left end of the screen, and, in a case the advance key is provided at the right end of the screen, the touch detection area is extended toward the center of the screen by a distance greater than a distance extended toward the right end of the screen, such that a center of the indication part is offset from a center of the touch detection area in a width direction.

2. The touch panel device according to claim 1, further comprising:
another key provided adjacent to the advance key,
wherein the touch detection area of the advance key overlaps the another key.

3. The touch panel device according to claim 2,
wherein the another key includes an icon part and a character part, and the touch detection area of the advance key overlaps the character part.

4. The touch panel device according to claim 1,
wherein the touch panel device is included in an onboard center display provided in a dash panel of a vehicle at a center of the vehicle with respect to a width direction of the vehicle between a driver's seat and a passenger's seat, and
wherein in a case of a vehicle with a right-side steering wheel, the touch detection area is made larger than the indication part in the advance key provided at the left end; and, in a case of a vehicle with a left-side steering wheel, the touch detection area is made larger than the indication part in the advance key provided at the right end.

* * * * *